(12) United States Patent
Yamamoto

(10) Patent No.: US 11,108,305 B2
(45) Date of Patent: Aug. 31, 2021

(54) DRIVE DEVICE

(71) Applicant: DENSO CORPORATION, Kariya (JP)

(72) Inventor: Naohiro Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 228 days.

(21) Appl. No.: 16/376,159

(22) Filed: Apr. 5, 2019

(65) Prior Publication Data

US 2019/0312491 A1 Oct. 10, 2019

(30) Foreign Application Priority Data

Apr. 10, 2018 (JP) ................................ JP2018-75413

(51) Int. Cl.
| H02K 11/33 | (2016.01) |
| H02K 5/22 | (2006.01) |
| H02K 11/00 | (2016.01) |

(52) U.S. Cl.
CPC ............. *H02K 11/33* (2016.01); *H02K 5/225* (2013.01); *H02K 11/0094* (2013.01)

(58) Field of Classification Search
CPC .......... H02K 11/33; H02K 11/00; H02K 5/22; H02K 11/0094; H02K 3/28; H02K 5/225; H02K 2211/03; B62D 5/0406
See application file for complete search history.

(56) References Cited

U.S. PATENT DOCUMENTS

| 2015/0115755 A1* | 4/2015 | Yamasaki | ............ H02K 11/024 310/71 |
| 2016/0036296 A1* | 2/2016 | Kabune | .................. H02K 11/21 180/446 |
| 2016/0036305 A1* | 2/2016 | Kawata | ................ B62D 5/0463 180/443 |
| 2016/0204670 A1 | 7/2016 | Yamasaki | |
| 2017/0294860 A1* | 10/2017 | Yamasaki | .............. H02K 5/225 |

FOREIGN PATENT DOCUMENTS

| JP | 2015-89216 A | 5/2015 |
| JP | 2016-127780 A | 7/2016 |
| JP | 2017-189034 A | 10/2017 |

* cited by examiner

*Primary Examiner* — Naishadh N Desai
(74) *Attorney, Agent, or Firm* — Maschoff Brennan

(57) ABSTRACT

A drive device includes a motor and a controller coaxially disposed with the motor for controlling the motor. The drive device further includes a cover for covering the controller with an opening, and a connector part separate from the cover for connecting to an external connector. The connector part includes connectors that extend and protrude longitudinally through the opening of the cover. The longitudinal axis of the mouth of each connector in the connector part is arranged and angled differently relative to the mouths of adjacent connectors so that the connectors are positioned within an axial silhouette of the motor.

16 Claims, 10 Drawing Sheets

DRIVE DEVICE

CROSS REFERENCE TO RELATED APPLICATION

The present application is based on and claims the benefit of priority of Japanese Patent Application No. 2018-075413, filed on Apr. 10, 2018, the disclosure of which is incorporated herein by reference.

TECHNICAL FIELD

The present disclosure relates to a drive device or driver for transmitting power to an electric motor.

BACKGROUND INFORMATION

An integrally packaged motor and controller drive device may include an electric motor and a controller for controlling the electric motor packaged together as a single, integral device (e.g., in one housing). Such a drive device may include terminals extending from the drive device for making an electrical/signal connection to the drive device. Problems may arise when additional terminals are added to such a drive device. As such, drive devices are subject to improvement.

SUMMARY

The present disclosure describes a drive device that limits and/or prevents size increases to the body of the drive device in a radial direction. In other words, the present disclosure describes a drive device with a connector arrangement on and around an opening of a cover that limits and/or prevents overall increases to the diameter of the body/housing of the drive device when additional connectors are added to the drive device.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
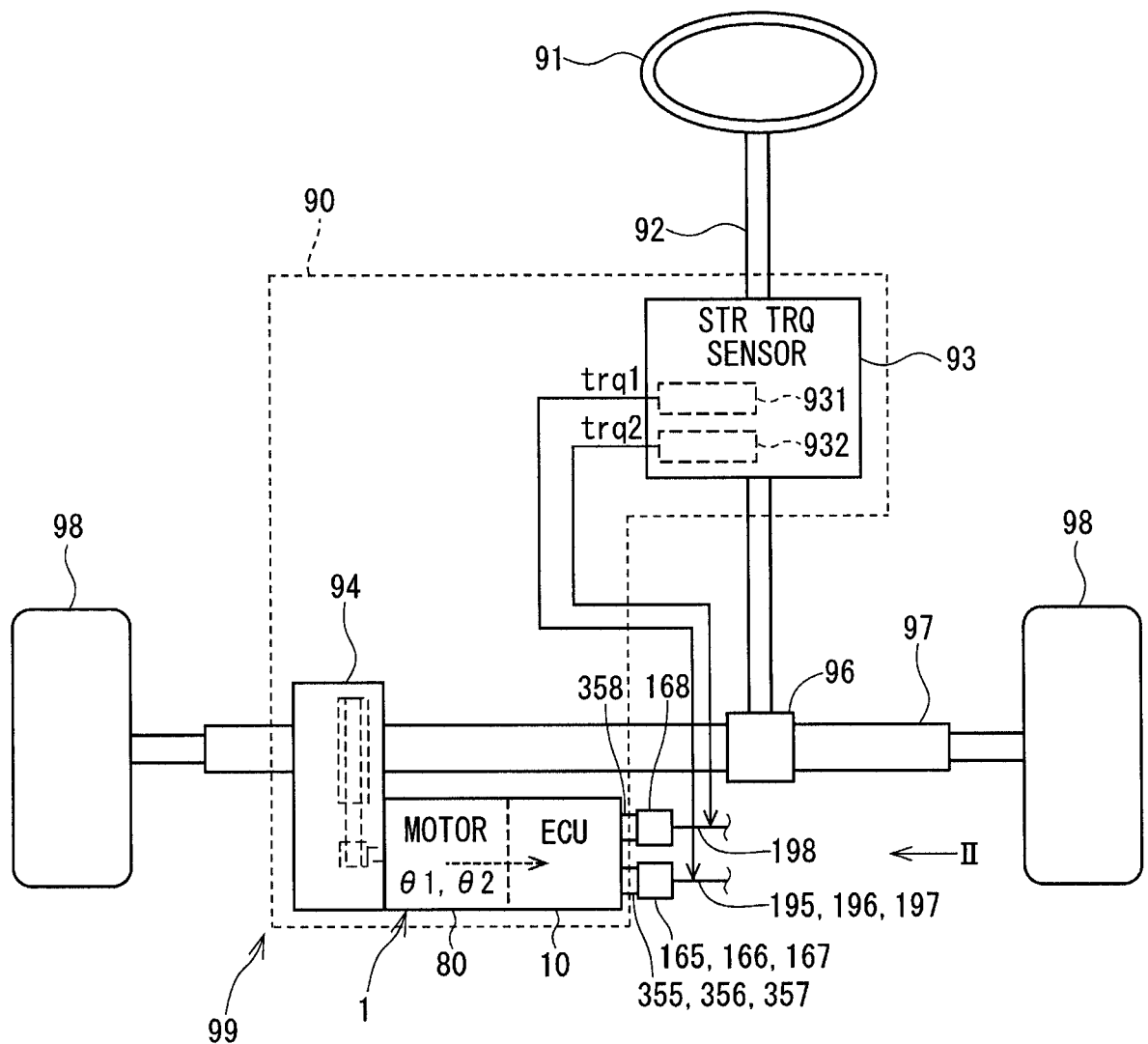
FIG. 1 illustrates a configuration of an electric power steering apparatus including a drive device.

An integrally packaged motor and controller drive device includes an electric motor and a controller for controlling the electric motor packaged together as a single, integral device in a single housing. Such drive devices may be used in an electric power steering apparatus. In this drive device, the motor has two sets of winding wires (i.e., windings), and the controller has two control sections to supply electric current separately to the two windings. The controller has two connectors corresponding to each of the two control sections, and the two connectors may be integrally formed on a cover that covers the two control sections.

When the number of terminals increases, for example, due to an increase in the number of control systems, such an increase in terminals leads to an increase in the number of connectors. Consequently, such an increase in connectors requires extra space on the cover to accommodate the connectors. As a result, increases to the number of connectors may cause an increase in the size of the drive device (e.g., diameter). Size increase issues with the housing and cover may be especially concerning when three or more connectors are included as separate structural members from the cover, where such connectors are arranged to protrude through an opening on the cover.

The embodiments are described with reference to the drawings. In the following embodiments, like elements and features among the different embodiments use the same reference numerals, and a repeat description of the like elements and features may be omitted from the description of the latter embodiments.

The drive devices described in the embodiments can be applied to an electric power steering apparatus of a vehicle, and output a steering assist torque.

A configuration of the electric power steering apparatus 90 is described with reference to FIGS. 1. The electric power steering apparatus 90 serves as a base, to which the device drivers in each of the embodiments may be applied. FIG. 1 shows an overall configuration of a steering system 99 including an electric power steering apparatus 90. Although the electric power steering apparatus 90 shown in FIG. 1 is a rack assist type, the apparatus 90 is also applicable to a column assist type electric power steering apparatus.

The steering system 99 includes a steering wheel 91, a steering shaft 92, a pinion gear 96, a rack shaft 97, wheels 98, and the electric power steering apparatus 90. The steering shaft 92 is connected to the steering wheel 91. The pinion gear 96 is disposed at an end of the steering shaft 92 and engages with the rack shaft 97. Wheels 98 are attached at both ends of the rack shaft 97 via a linkage such as tie rods. When a driver of the vehicle rotates the steering wheel 91, the steering shaft 92 connected to the steering wheel 91 rotates. The rotational motion of the steering shaft 92 is converted into a linear motion by the pinion gear 96 to linearly move the rack shaft 97. The pair of wheels 98 is steered to an angle corresponding to the displacement amount of the rack shaft 97.

The electric power steering apparatus 90 includes a steering torque sensor 93, a control unit 10, a motor 80, and a speed reducer 94. The steering torque sensor 93 is provided at an intermediate portion of the steering shaft 92, and detects a steering torque of the driver. As shown in FIG. 1, the duplexed steering torque sensor 93 may include a first torque sensor 931 to detect a first steering torque trq1 and a second torque sensor 932 to detect a second steering torque trq2 in a duplexed or redundant manner. In alternative configurations where the steering torque sensor is not provided redundantly, a single detected value of one steering torque trq may be used.

The control unit 10 obtains the steering torques trq1, trq2 detected by the steering torque sensor 93, and the electric angles θ1, θ2 of the motor 80 detected by a rotation angle sensor (not shown). The control unit 10 controls the drive of the motor 80 to generate a desired assist torque based on information such as the electric angles and the motor current detected inside the control unit 10. The assist torque output from the motor 80 is transmitted to the rack shaft 97 via the speed reducer 94.

The control unit 10 is integrally formed on one side of the motor 80 (e.g., at one end of the motor 80 along the longitudinal axis of the motor 80). The motor 80 and the control unit 10 are part of a drive device 1. The drive device 1 is an integrated motor/controller-type drive device 1. As shown in FIG. 1, the control unit 10 is disposed coaxially with the motor 80 on the side of the motor 80 that is opposite to the output side of the motor 80 (i.e., opposite the output shaft of the motor 80). In other embodiments, the control unit 10 may be arranged coaxially with the motor 80 on the output shaft side of the motor 80.

Figure 3:
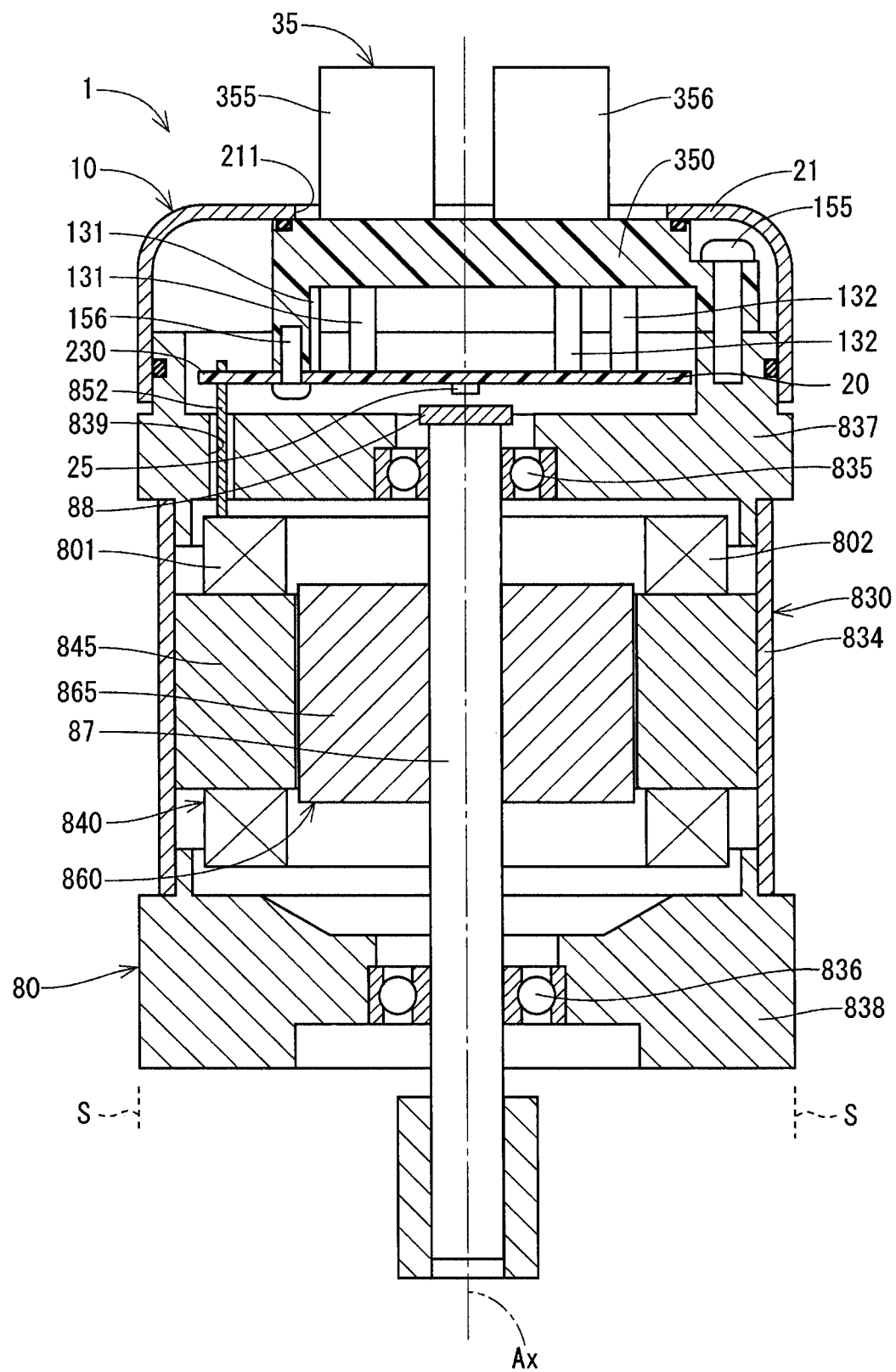
FIG. 3 is a longitudinal cross-sectional view of the drive device in the first embodiment taken along a line III-III in FIG. 2.
Figure 4:
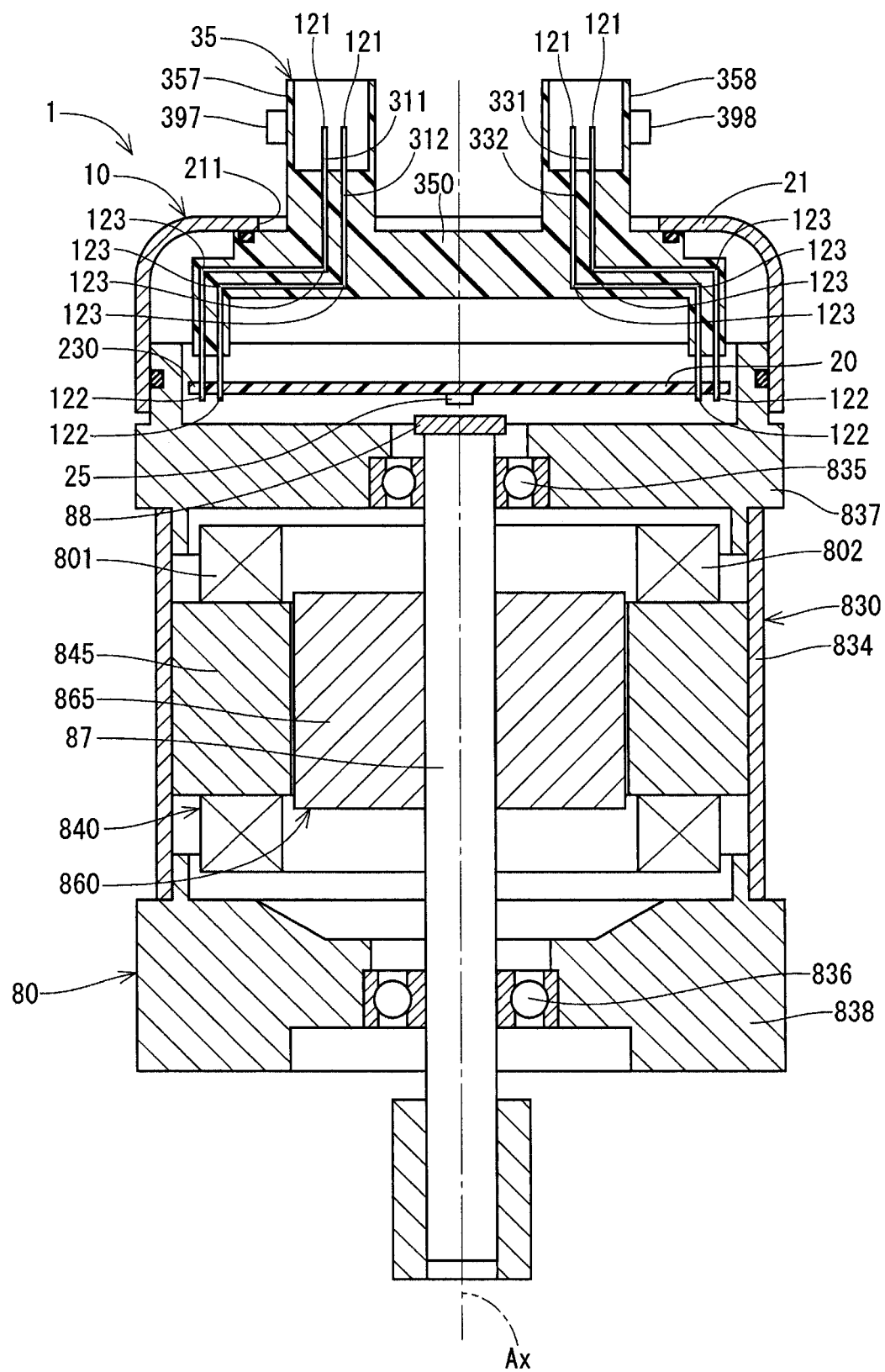
FIG. 4 is another longitudinal cross-sectional view of the drive device in the first embodiment taken along a line IV-IV in FIG. 2.

With references to FIGS. 3 and 4, the motor 80 is a three-phase brushless motor that includes a stator 840 and a rotor 860 housed within a housing 830. The stator 840 has a stator core 845 fixed to the housing 830 and two sets of three-phase winding wires 801 and 802 assembled to the stator core 845. Three lead wires 851, 853, 855 (shown in FIGS. 8 and 10) are respectively connected to, and extend from, the three phases of winding wires (e.g., U-phase, V-phase, and W-phase, shown in FIG. 5) that form the first set of winding wires 801. Similarly, three lead wires 852, 854, 856 (shown in FIGS. 8 and 10) are respectively connected to and extend from the three phases of the winding wires that form the second set of winding wires 802.

The rotor 860 has a shaft 87 supported by a rear bearing 835 and a front bearing 836, and a rotor core 865 into which the shaft 87 is fitted. The rotor 860 is disposed inside the stator 840 and rotates relative to the stator 840. A permanent magnet 88 is attached at one end of the shaft 87.

The housing 830 has a cylindrical case 834, a rear frame end 837 at one end of the case 834, and a front frame end 838 at the other end of the case 834. The rear frame end 837 and the front frame end 838 are fastened to each other by bolts or like fasteners (not shown). The lead wires 851-856 of each of the winding sets 801 and 802 are inserted into a lead wire insertion hole 839 in the rear frame end 837 and connected to the control unit 10.

Figure 5:
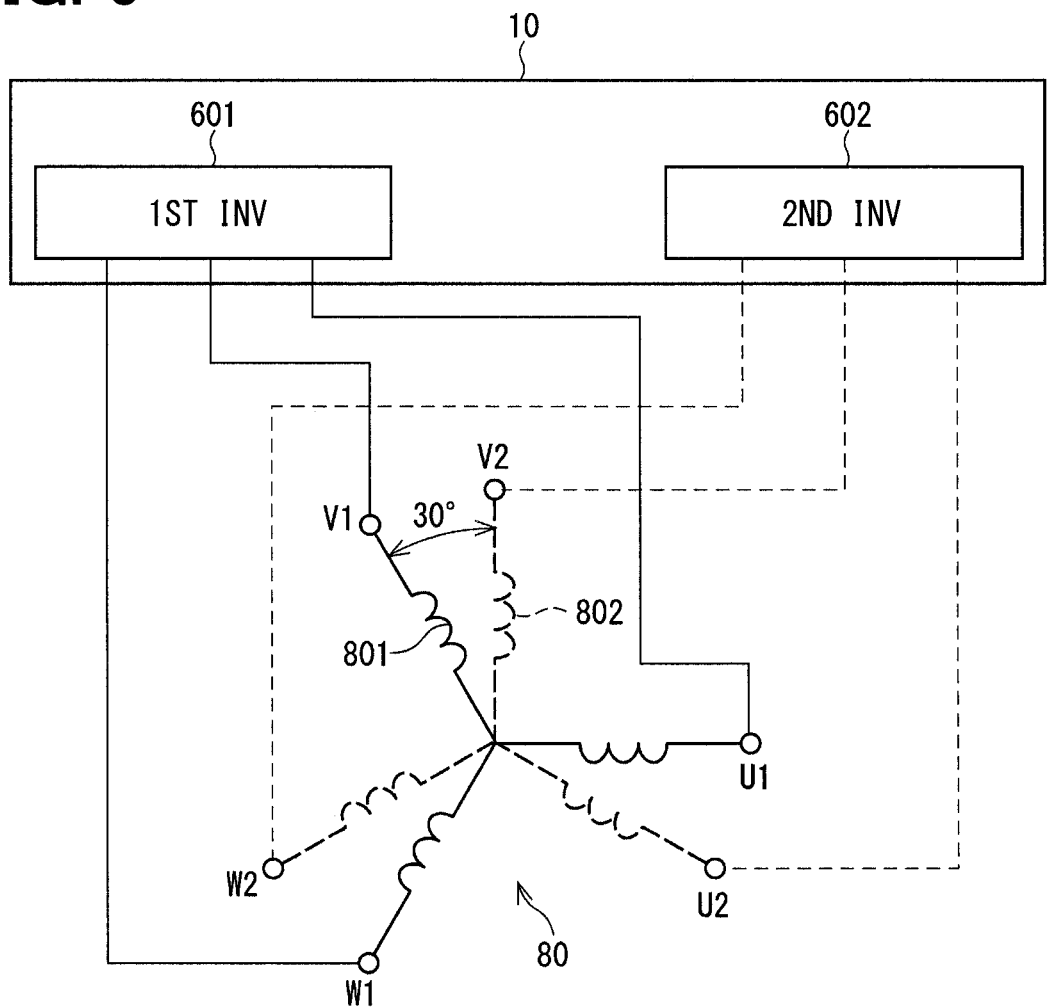
FIG. 5 illustrates a configuration of a polyphase coaxial motor.

As shown in FIG. 5, the sets of winding wires 801 and 802 are arranged at a common stator core with an electric angle of 30 degrees (i.e., shifted 30°) between wires of the same phase, among the sets of winding wires 801 and 802. For example, the wire V1 corresponding to the V-phase in the first winding wire set 801 is shifted 30 degrees relative to the wire V2 corresponding to the V-phase in the second winding wire set 802.

First Embodiment

The configuration of the drive device 1 in the first embodiment is described with reference to FIGS. 2 to 8. As shown in FIGS. 3 and 4, the control unit 10 includes a controller 20, a cover 21 covering the controller 20, a connector part 35 for connecting the controller 20 to external connectors 165, 166, 167, 168 of external cables 195, 196, 197, 198 (shown in FIG. 1). One or more of the external connectors 165, 166, 167, and 168 may be disposed on the external cables 195, 196, 197, and 198. The external cables 195, 196, 197, and 198 may be vehicle wiring cables such as a pigtail or wiring harness. The cover 21 protects the controller 20 from external impact and prevents the ingress of dust, water, and other materials to the interior of cover 21 to keep such materials away from the controller 20. The connector part 35 may be separate from the cover 21. That is, the connector part 35 may be made as a different and separate component/member from the cover 21, and joined/connected with the cover 21.

The controller 20 includes a substrate 230 and various electronic components mounted on the substrate 230. The various electronic components are not shown in FIGS. 3 and 4 but are later described with reference to FIGS. 6 and 7. The substrate 230 is, for example, a printed circuit board and disposed at a position facing the rear frame end 837 and the connector part 35. That is, one side of the substrate 230 faces toward the rear frame end 837 and the motor 80, and the other side of the substrate 230 faces toward the connector part 35 and the cover 21. The various electronic components of the controller 20 that are later described with reference to FIGS. 6 and 7 may be disposed on either side of the substrate 230, for example, based on the layout of the controller 20 and the substrate 230, and other design considerations. As shown in FIG. 3, the substrate 230 is disposed coaxially with the connector part 35 and may be fixed to the connector part 35 by a screw/connector 156.

The drive device 1 of the present embodiment may be configured as a duplexed, redundant drive device 1. As such, the controller 20 may be configured to have two electronic systems where each system is redundant to the other. On the substrate 230, the two systems of electronic components are included independently for each system in a completely redundant configuration.

The number of the substrates 230 is described as one in the first embodiment, but in other embodiments, two or more substrates may be used.

Figure 6:
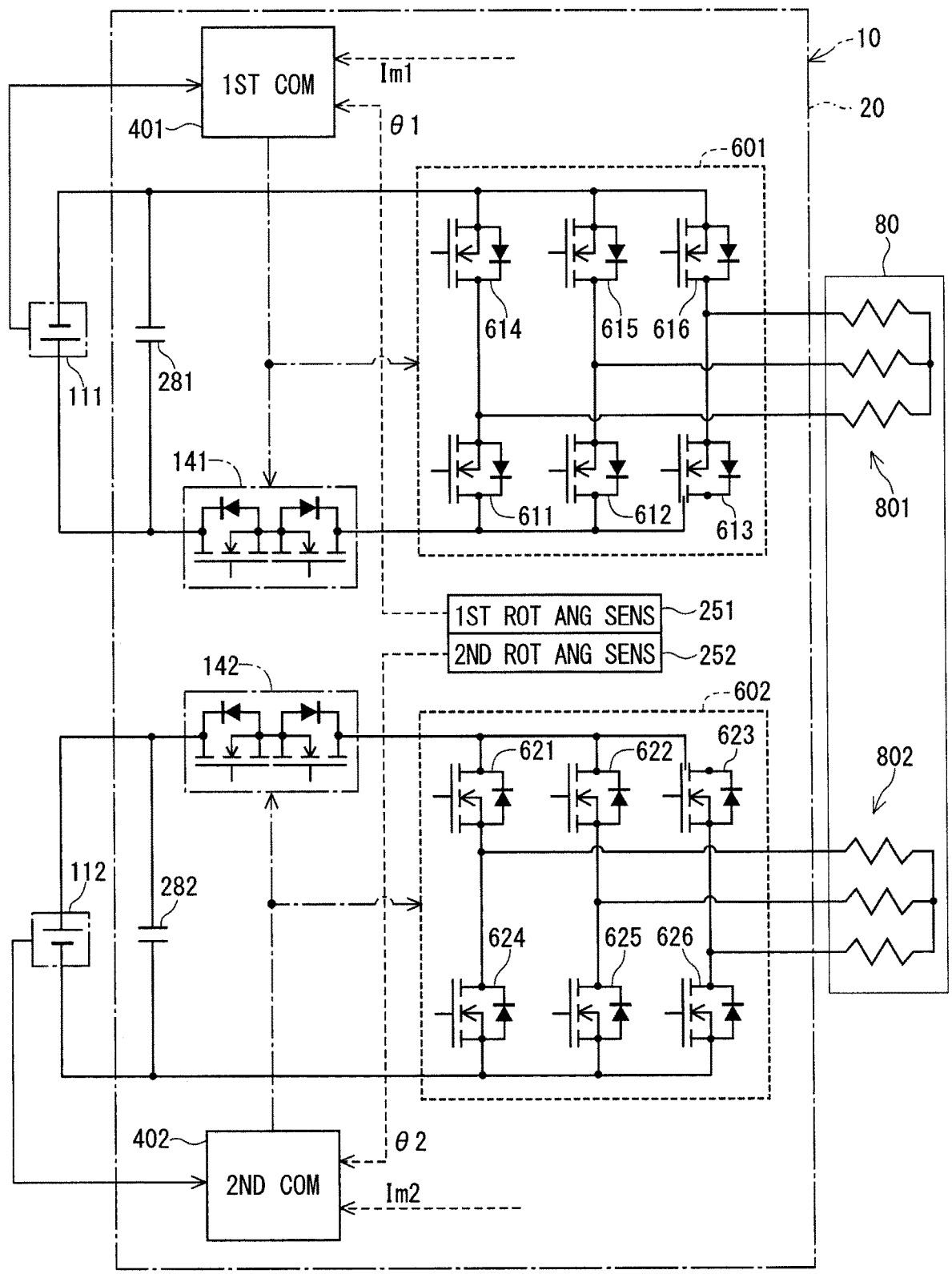
FIG. 6 is a schematic diagram of the drive device in the first embodiment.

FIG. 6 shows a circuit configuration of the drive device 1. The controller 20 is a double-system motor control device that has two inverters 601 and 602 that function as "power converters," two computers 401 and 402, and is connected to the two sets of winding wires 801 and 802 in the motor 80. In the double system, the combination of the elements including the set of winding wires, the inverter, and the computer may be referred to as a "system," i.e., one set of components in the redundant configuration. For example, the inverter 601, the computer 401, the winding wires 801, and the other electronic elements associated with these components may be referred to as a system.

To distinguish between the different systems in the description, "first" or "first system" may be added to the components and/or signals of the first system, and "second" or "second system" may be added to the components and/or signals of the second system. For elements common to both systems, or when describing components in general, i.e., when there is no need to distinguish between the first and second systems, the "first" and "second" identifiers may be omitted Except for the switching elements, e.g., 611-616 and 621-626, "1" is added to the end of the reference characters of the components or signals used to describe the first system, and "2" is added to the end of the reference characters of the components or signals used to describe the second system.

The controller 20 includes the first and second inverters 601 and 602, the first and second power supply relays 141 and 142, the first and second rotation angle detection units 251 and 252, and the first and second computers 401 and 402. In the first embodiment, electric power is supplied to the first system from the first power source 111 and supplied to the second system from the second power source 112.

Two sets of six switching elements 611 to 616 and 621 to 626 such as metal-oxide semiconductor field-effect transistors (MOSFETs) are bridge connected to serve respectively as the first inverter 601 and the second inverter 602. The first inverter 601 performs a switching operation according to a drive signal from the first computer 401, converts a direct current (DC) power of the first power source 111, and supplies the electric power to the first set of winding wires 801. The second inverter 602 performs a switching operation according to a drive signal from the second computer 402, converts a DC power of the second power source 112, and supplies the power to the second set of winding wires 802.

The power supply relay 141 is included on the power supply line at the input of the first inverter 601, and the power supply relay 142 is included on the power supply line at the input of the second inverter 602. The first and second power supply relays 141 and 142 shown in FIG. 6 both include a protection function that protects against a reverse connection of the power supply. The protection function in each of the power supply relays 141 and 142 is realized by a series connection of two switching elements having parasitic diodes opposite to each other. However, in place of the protection function, the power supply relays 141 and 142 may include one switching element or be provided as mechanical relays that do not include the reverse connection protection function.

A capacitor 281 is included at the input sections of the first inverter 601 and a capacitor 282 is included at the input section of the second inverter 602. The capacitors 281 and 282 respectively smooth the electric power input from the first and second power supplies 111 and 112, and limit and/or prevent noise caused by the switching of the switching elements 611-616 and 621-626 in the first and second inverters 601 and 602. Each of the capacitors 281 and 282 may form a filter circuit together with an inductor (not shown) in their respective systems. That is, the first system may have a filter circuit with the first capacitor 281, and the second system may have a filter circuit with the second capacitor 282.

The first rotation angle detection unit 251 detects an electric angle θ1 of the motor 80 and outputs the electric angle θ1 to the first computer 401. The second rotation angle detection unit 252 detects an electric angle θ2 of the motor 80 and outputs the electric angle θ2 to the second computer 402. The first rotation angle detection unit 251 has a power supply line and a signal line that are separate and distinct from the power supply line and the signal line of the second rotation angle detection unit 252.

The first computer 401 calculates a drive signal for instructing the operation of the first inverter 601 based on feedback information such as the steering torque trq1, an electric current Im1, and the electric angle θ1. The second computer 402 calculates a drive signal for instructing the operation of the second inverter 602 based on feedback information such as the steering torque trq2, an electric current Im2, and the electric angle θ2.

Figure 7:
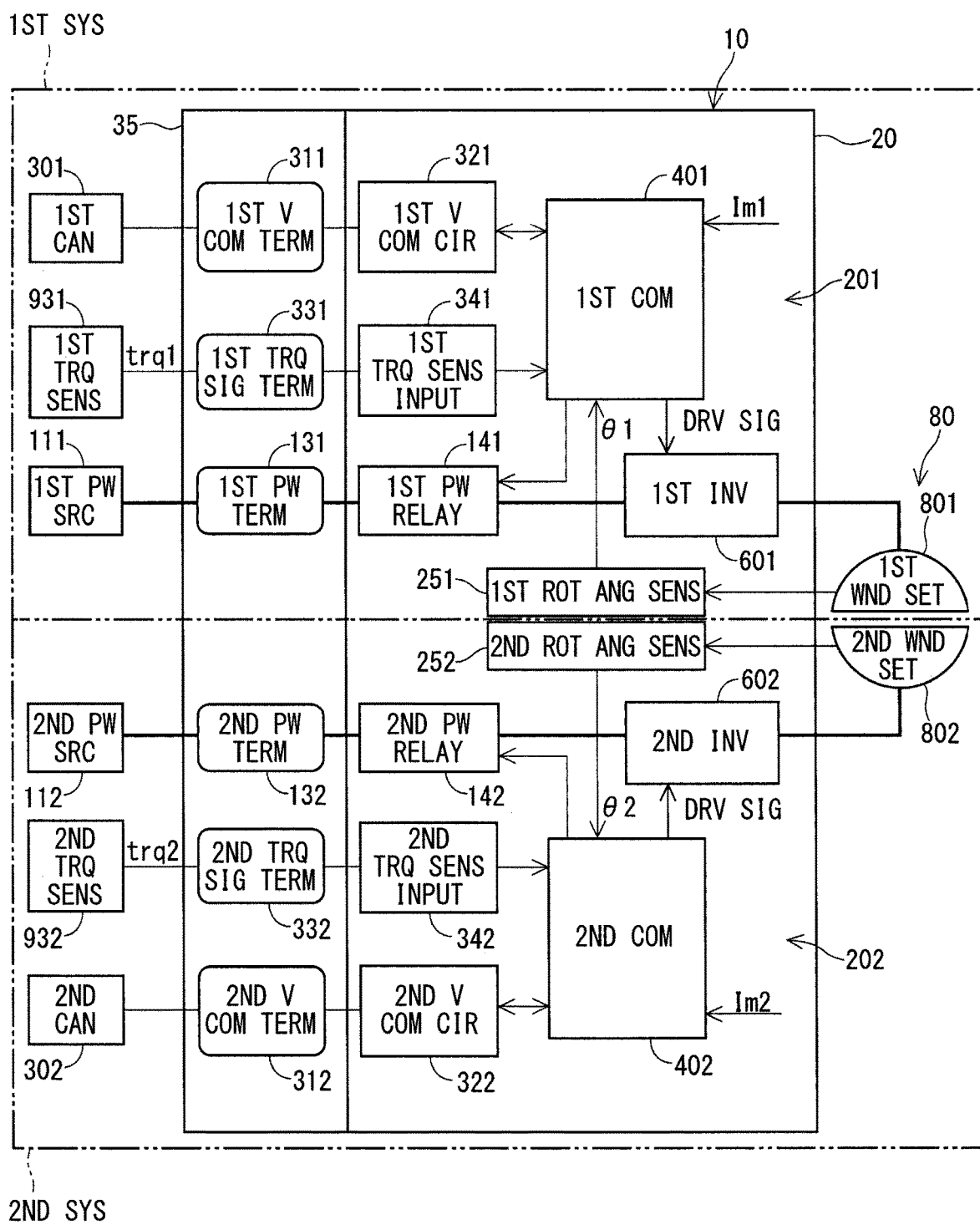
FIG. 7 is a control block diagram of the drive device in the first embodiment.

FIG. 7 shows a control configuration of the drive device 1. In FIG. 7, the first system and the second system are composed of two completely independent sets of elements, and have a redundant configuration, i.e., are configured as a "whole duplexed system."

In the controller 20, electronic components of the first system for controlling the power supply to the winding wires 801 make up a first system control unit 201, and electronic components of the second system for controlling the power supply to the winding wires 802 make up a second system control unit 202.

The connector part 35 includes a first system terminal group connected to the first system control unit 201 and a second system terminal group connected to the second system control unit 202. The first system terminal group includes a first power supply terminal 131 for supplying electric power to the first system control unit 201, a first vehicle communication terminal 311 for inputting a signal to the first system control unit 201, and a first torque signal terminal 331. The second system terminal group includes a second power supply terminal 132 for supplying electric power to the second system control unit 202, a second vehicle communication terminal 312 for inputting a signal to the second system control unit 202, and a second torque signal terminal 332.

The first power supply terminal 131 is connected to the first power source 111. Electric power from the first power source 111 is supplied to the first set of winding wires 801 via the first power supply terminal 131, the first power supply relay 141, and the first inverter 601. Electric power from the first power source 111 is also supplied to the first computer 401 and the sensors of the first system.

The second power supply terminal 132 is connected to the second power source 112. Electric power from the second power source 112 is supplied to the second winding set 802 via the second power supply terminal 132, the second power supply relay 142, and the second inverter 602. Electric power of the second power source 112 is also supplied to the second computer 402 and the sensors of the second system.

When a Controller Area Network (CAN or CAN bus) is redundantly provided as a vehicle communication network, the first vehicle communication terminal 311 is connected at a position between a first CAN 301 and the first vehicle communication circuit 321. The second vehicle communication terminal 312 is connected at a position between a second CAN 302 and the second vehicle communication circuit 322. When a CAN is not provided redundantly, the vehicle communication terminals 311 and 312 of the two systems may be connected to the same CAN. A vehicle communication network using a communication standard other than CAN may be used. For example, a network standard such as CAN with Flexible Data rate (CAN-FD) or FlexRay may be used.

The first torque signal terminal 331 is connected at a position between the first torque sensor 931 and a first torque sensor input circuit 341. The first torque sensor input circuit 341 notifies the first computer 401 of the steering torque trq1 sent to the first torque signal terminal 331 by the first torque sensor 931. The second torque signal terminal 332 is connected at a position between the second torque sensor 932 and the second torque sensor input circuit 342. The second torque sensor input circuit 342 notifies the second computer 402 of the steering torque trq2 sent to the second torque signal terminal 332 by the second torque sensor 932.

The computers 401 and 402 can mutually transmit and receive information to and from each other by performing inter-computer communication. When an abnormality occurs in one of the two systems, the controller 20 can continue the motor control by using the normal functioning system (i.e., by using the other system that is operating normally without abnormalities).

FIGS. 2, 3, 4, and 8 show the configuration of the connector part 35. The following description assumes that the drive device 1 is cylindrical in shape. Thus, the following description may describe the geometry of the drive device 1 and the arrangement, orientation, disposition, and positioning of the elements, components and features of the drive device 1 in terms of a circle (e.g., radial distance). However, the drive device 1 is not limited to a cylindrical shape and may be in a non-circular shape where the circular descriptions in the description may be substituted with a corresponding description based on the shape and the geometry of the drive device 1 (e.g., replacing "radial distance" with "a vector length from a center point to an edge of the drive device" for a drive device having a rectangular shaped cross section).

Figure 2:
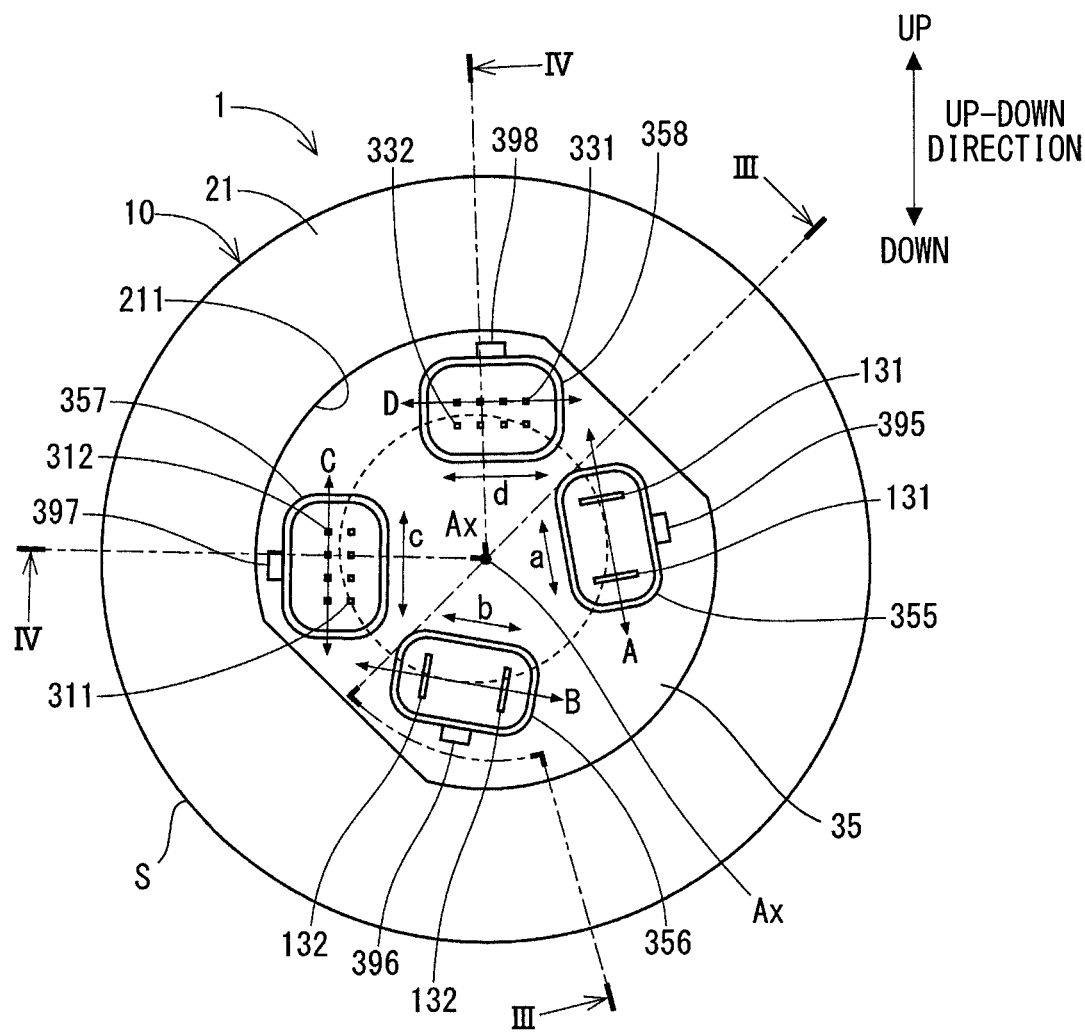
FIG. 2 illustrates a top view of an upper surface of a drive device in the first embodiment, as seen in a direction of an arrow II in FIG. 1.
Figure 8:
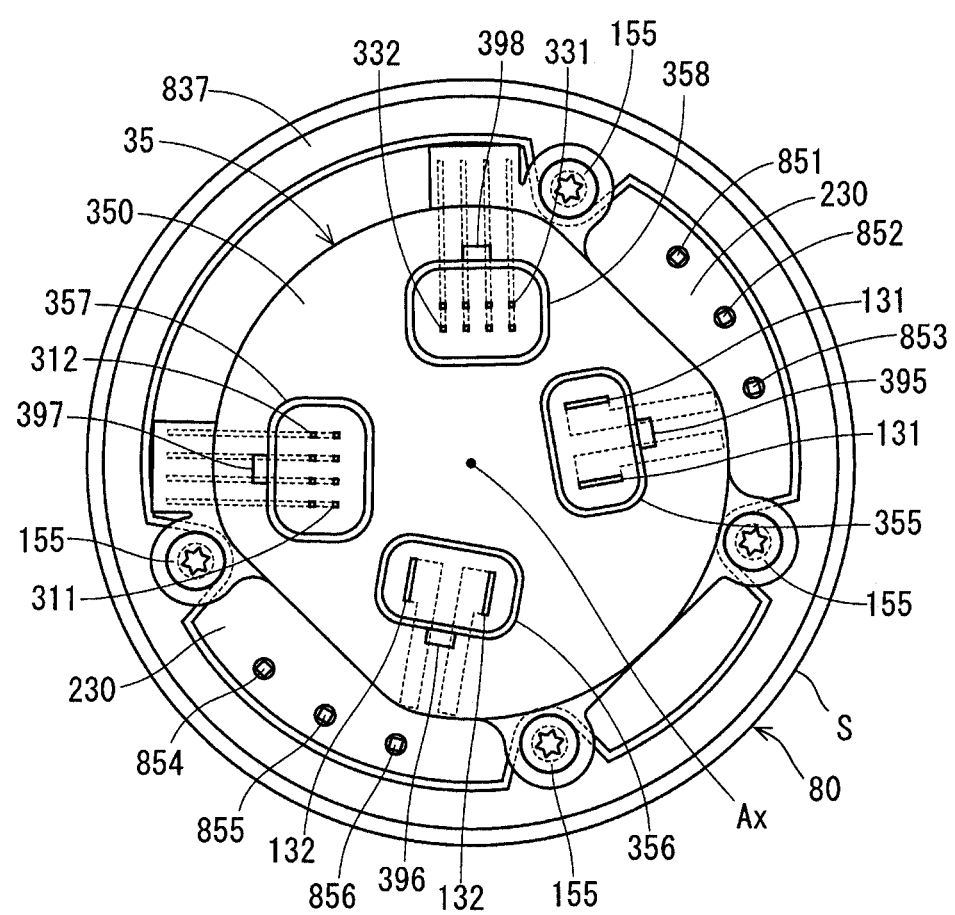
FIG. 8 illustrates a top view of an upper part of the drive device in the first embodiment.

In FIGS. 2, 3, 4, and 8, a longitudinal axis of the motor 80 of the drive device 1 is shown as axis Ax. In FIGS. 2 and 8 showing an axial view, axis Ax is shown as a point where the longitudinal axis extends into and out of the drawing sheet. In FIGS. 3 and 4 showing a cross-sectional view, the axis Ax is shown as a line that extends from the top to the bottom of the drawing sheet. The axis Ax is disposed centrally within the drive device 1. A direction extending orthogonally from the axis Ax may be described as a "radial direction" or "radially," and a direction running parallel to the axis Ax may be described as an "axial direction" or "axially."

The arrangement, orientation, disposition, and positioning of the elements, components, and features in the drive device 1 may be described relative to the axis Ax. For example, the position of a first element may be described as being at a position with a greater radial distance from the axis Ax than the position of a second element to indicate that the first element is disposed more radially outward than the position of the second element.

"Periphery" may also be used to describe the arrangement, orientation, disposition, and positioning of the elements, components, and features in the drive device 1. For example, the periphery of the drive device 1 may indicate a position near the edge of the drive device 1 away from the axis Ax such as near the housing 830 or near the cover 21. In another example, describing that an element is disposed near the periphery of the substrate 230 may indicate that the element is disposed near the edge of the substrate 230. If the substrate 230 is circular in shape and disposed coaxially within the drive device 1, the periphery of the substrate may be at a radial distance from the axis Ax that is at or around the radius measurement of the substrate itself.

The connector part 35 has a base portion 350, connectors 355, 356, 357, and 358, the power supply terminals 131 and 132, the vehicle communication terminals 311 and 312, and the torque signal terminals 331 and 332. The base portion 350 is fixed to the rear frame end 837 by a screw 155 that serves as a fastening member. That is, the screw 155 may also be referred to as the fastening member 155. The connectors 355, 356, 357, and 358 protrude in the axial direction from the base portion 350 in a direction away from the motor 80 and through an opening 211 in the cover 21 to protrude outside the cover 21.

The power supply connector 355 houses and holds the first power supply terminal 131. The power supply connector 356 houses and holds the second power supply terminal 132. The vehicle communication connector 357 houses and holds the vehicle communication terminals 311 and 312. The torque signal connector 358 houses and holds the torque signal terminals 331 and 332. These connectors 355, 356, 357, and 358 all have the same insertion and removal direction in the axial direction, that is, in the direction of axis Ax. The insertion and removal direction for inserting and removing the external connector coincides with a frontage direction (e.g., the face or mouth of the connector). The mouth is an opening at the tip of the connector. The external connectors connect to the connectors 355, 357, 357, and 358.

In the description, when the connectors 355, 356, 357, 358 are not particularly distinguished from each other, they are described simply as a "connector" in the singular. Similarly, the first power supply terminal 131 and the second power supply terminal 132 may be referred to as the "power supply terminal," the vehicle communication terminals 311 and 312 may be referred to as "the vehicle communication terminal," and the torque signal terminals 331 and 332 maybe referred to as "the torque signal terminal," in the singular, unless described otherwise.

As shown in FIGS. 2 and 8, the mouths of each of the connectors 355, 356, 357, and 358 are substantially rectangular in shape. Each of the mouths has a long side oriented toward the axis Ax and a long side oriented toward the periphery of the drive device 1. "Longitudinal axis" may be used to describe the long side, length, or long-axis of the connectors, or mouths of the connectors. As shown in FIG. 2, "a" is the longitudinal axis of the mouth of the connector 355, "b" is the longitudinal axis of the mouth of the connector 356, "c" is the longitudinal axis of the mouth of the connector 357, and "d" is the longitudinal axis of the mouth of the connector 358. The short sides of the connector extend orthogonally to the long sides and the longitudinal axis of the connector. For example, the long side of the mouth of the connector 355 extends in the same direction as the longitudinal axis a, and the short side of the mouth of the connector 355 extends in a direction orthogonal to the longitudinal axis a.

The longitudinal axes a, b, c, and d of the mouths of the connectors 355, 356, 357, and 358 are arranged at different angles and orientations relative to each other, such that the orientation and angular position of one connector differs from the orientation and angular position of its adjacent and neighboring connectors. The angle and orientation of the longitudinal axis, the connectors, and the connector mouth, may be used to describe an angular orientation, e.g., mouth angle. The angle and orientation may refer to an angular measurement in a spherical coordinate system, where such angular measurement may be given, for example, as an angle relative to a reference point, azimuth, or described in terms of radians.

In the first embodiment, as shown in FIG. 8, in addition to the respective connectors 355, 356, 357, and 358, the entire connector part 35 including the screw 155 and the base portion 350 are contained (i.e., arranged/positioned) within the silhouette of the motor 80, as viewed in the axial direction. The silhouette or footprint of the motor 80 may refer to the overall diameter of the motor 80 and "contained within the silhouette of the motor 80" may refer to being positioned within the periphery (i.e., within the diameter) of the circular-shaped motor 80, where such elements within the silhouette of the motor 80 do not extend beyond the diameter of the motor 80 or overhang the silhouette of the motor. The silhouette of the motor is shown, for example, as dashed lines "S" in the cross-sectional view of FIG. 3, and as "S" in FIG. 8, where the silhouette S of the motor 80 approximates the overall diameter of the drive device 1 and the motor 8. The connectors 355, 356, 357, and 358 are arranged around the axis Ax.

With reference to FIG. 2, the longitudinal directions a, b, c, d of the mouths of connectors 355, 356, 357, and 358 are approximately tangential to a dashed-line circle centered on the axis Ax. Similarly stated, each of the connectors 355, 356, 357, and 358 are disposed on a circle surrounding the axis Ax shown in FIG. 2 as a dashed-line circle. Each connector 355, 356, 357, and 358 has a gap between its circumferentially-adjacent connectors, where the measured value (e.g., length measurement) of the gap between a connector and it adjacent connector is smaller than the measured value (e.g., width measure) of the short side of the connector mouth. For example, for connector 355, the distance of the gap between the connector 355 and the connector 358 (or the distance between the connector 355 and the connector 356) is less than the width (e.g., short side measurement) of the mouth of the connector 355.

In FIG. 2, an arrangement direction "A" of the plurality of the power supply terminals 131 in the mouth of the power supply connector 355 coincides with the longitudinal direction or axis "a" of the mouth of the power supply connector 355. That is, the power supply terminals 131 are arranged along a straight line extending through the power supply connector 355 that may be referred to as the arrangement direction A, as shown in FIG. 2, where the arrangement direction A and the longitudinal axis a are parallel to one another, and extend in the same direction. The arrangement direction A bisects the power supply connector 355. An arrangement direction B of the plurality of the power supply terminals 132 in the mouth of the power supply connector 356 coincides with the longitudinal direction b of the mouth of the power supply connector 356. The arrangement direction B bisects the power supply connector 356. An arrangement direction C of the plurality of the vehicle communication terminals 311 and 312 in the mouth of the vehicle communication connector 357 coincides with the longitudinal direction c of the mouth of the vehicle communication connector 357. The arrangement direction C bisects the vehicle communication connector 357. An arrangement direction D of the plurality of the torque signal terminals 331, 332 in the mouth of the torque signal connector 358 coincides with the longitudinal direction d of the mouth of the torque signal connector 358. The arrangement direction D bisects the torque signal connector 358. The angles and orientations of the arrangement directions A, B, C and D are respectively different from each other. The arrangement directions are straight lines that extend through the connectors. Describing that the terminals in a connector are arranged "along" an arrangement direction may mean that the terminals are arranged around and in the direction of the straight, bisecting line referred to as the arrangement direction, and not necessarily disposed on the line itself (i.e., the arrangement direction itself).

Each connector has a protrusion 395, 396, 397, or 398 disposed on the periphery-facing long side to engage and/or lock the external connector to the connector, when the external connectors connect to the connectors 355, 356, 357, and 358. The protrusions 395, 396, 397, 398 are formed to protrude radially outward from their respective connectors 355, 356, 357, and 358 toward the periphery of the drive device 1. That is, a protrusion of one connector protrudes away from the other connectors and is not formed in the gap between the connector and its adjacent connectors. The protrusion may also be referred to as a boss. That is, the protrusions 395, 396, 397, and 398 may also be referred to as bosses 395, 396, 397, and 398.

As shown in FIG. 4, each terminal (e.g., the communication terminals 311 and 312, and the torque signal terminals 331 and 332) has an external connection end portion 121 in the connector mouth, a substrate connection end portion 122 connected to the substrate 230 of the controller 20, and has two bends 123. The external end portions 121 are disposed radially inward from the substrate connection end portions 122 at positions closer to the axis Ax. The bends 123 help to position the external end portions 121 more radially inward than the substrate connection end portions 122. In other words, the substrate connection end portions 122 are disposed at a greater radial distance from the axis Ax than the external end portions 121. The bends 123 are formed at positions between the external connection end portion 121 and the substrate connection end portion 122, and may be, for example, right angle bends. Although the power supply terminals 131 and 132 are not shown in FIG. 4, the arrangement and orientation of the power supply terminals 131 and 132 are similar to the arrangement and orientation of the vehicle communication terminals 311 and 312 and the torque signal terminals 331 and 332 shown in FIG. 4. That is, the power supply terminals 131 and 132 may have two bends 123 to position the external connection end portions 121 of the power supply terminals 131 and 132 closer to the axis Ax than the substrate end portions 122. The vehicle communication terminals 311 and 312 and the torque signal terminals 331 and 332 may have the same shape.

As shown in FIGS. 3 and 8, the lead wires 851 to 856 are connected to the substrate 230 of the controller 20 at a position outside the housing 830. The substrate 230 of the controller 20 is disposed coaxially with, and fixed to, the base portion 350 of the connector part 35 with a screw or connector 156. The connector part 35 is arranged so as to not overlap with the connection positions of the lead wires 851 to 856 and the substrate 230. In other words, as seen in the top view in FIG. 8, the connector part 35 is arranged coaxially with the substrate 230, but the connector part 35 does not cover or overlap the portion of the substrate 230 where the lead wires 851, 852, 853, 854, 855, and 856 connect to the substrate 230.

The control unit 10 may be assembled, for example, as follows. First, the controller 20 including the substrate 230 is fixed to the connector part 35 via the connector 156. Then the connector part 35 and the substrate 230, as a subassembly, may be connected to the rear frame end 837 with the fastening member 155. The lead wires 851 to 856 are then soldered to the substrate 230. The cover 21 is then fixed to the connector part 35. In the above-described assembly process, the connector part 35 does not cover or obscure the connection positions between the lead wires 851 to 856 and the substrate 230 so that the lead wires 851 to 856 may be soldered without any obstructions to the soldering positions of the lead wires 851-856 on the substrate 230.

FIG. 2 illustrates the installation orientation of the drive device 1 in a vehicle. The up-down direction in FIG. 2 shows an orientation when the vehicle is normally operating, where down extends downward toward the ground (e.g., in a direction orthogonal to the road surface) and up extends upward toward the sky. When the drive device 1 is in the vehicle-installed state (e.g., the drive device is installed in the vehicle) shown in FIG. 2, the torque signal connector 358 is disposed above the power supply connectors 355 and 356 and the vehicle communication connector 357. During installation of the drive device 1, the torque signal connector 358 is connected to the external connector 168 prior to connecting the other external connectors 165, 166, and 167 to their respective connectors 355, 356 and 357. Arranging the torque signal connector 358 toward the top of the drive device 1, when the drive device 1 is positioned in the installation state, and connecting the external connector 168 to the torque signal connector 358 prior to the connection of the other external connectors 165, 166, 167, allows the external connectors 165, 166, and 167 to be respectively connected to the power supply connectors 355 and 356 and to the vehicle communication connector 357 without impediment. That is, the torque signal connector 358 is arranged on the top side in a vertical arrangement so that an already established connection between the external connector 168 and the torque signal connector 358 does not become an obstacle to forming subsequent, respective connections between the external connectors 165, 166, and 167, the power supply connectors 355 and 356, and the vehicle communication connector 357.

[Effects of the Present Embodiment]

As described above, in the first embodiment, the drive device 1 includes the motor 80 and the controller 20, where the motor 80 and the controller 20 are coaxially arranged relative to one another. The drive device 1 further includes the connector part 35 for connecting the controller 20 to the external connectors 165, 166, 167 and 168, and the cover 21 that covers the controller 25 is a wholly separate piece/member from the connector part 35. The connector part 35 has four connectors 355, 356, 357, and 358 that protrude in the axial direction through the opening 211 in the cover 21 to the outside of the cover 21. The respective connectors are arranged so that the longitudinal direction of their mouths (i.e., mouth angles) are at different angles and orientations relative to one another, and are arranged within the axial silhouette S of the motor 80 (e.g., within the total diameter of the motor and around the axis Ax. In addition to the arrangement of the connectors 355 to 358 within the axial silhouette S of the motor 80, the entire connector part 35, including the screw 155 and the base portion 350 to which the screw 155 is connected, is contained within the axial silhouette of the motor 80. By arranging each of the connectors 355 to 358 in such manner, the space typically reserved for disposing the connectors can be further reduced to limit increases to the diameter of the drive device 1 and to further reduce the size (e.g. diameter) of the drive device 1. Such space savings may also be used for accommodating additional connectors. The arrangement of the connectors 355-358 in the present embodiment allows for the connectors to be positioned within the silhouette S of the motor 80, without the connectors extending radially past the silhouette S of the motor 80 to accommodate additional connectors.

In addition, with the connectors extending only in the axial direction, the insertion direction of the external connectors relative to connectors can be the same for all the external connectors connecting to the drive device 1, regardless of whether additional connectors are added. As such, the drive device 1 of the present embodiment may ease the connection of the drive device 1 to the vehicle electrical system by maintaining the connection/insertion direction of all the connectors in the same direction.

In the first embodiment, the connectors include the power supply connectors 355 and 356 housing and holding the power supply terminals 131; the vehicle communication connector 357 housing and holding the vehicle communication terminals 311 and 312; and the torque signal connector 358 housing and holding the torque signal terminals 331 and 332. In the first embodiment, even when the number of connectors is increased due to the different types of terminals, where distinct connector mouths are provided for the different types of terminals, it is possible to limit overall increases to the size of the drive device 1 in the radial direction (e.g., to limit increases to the diameter of the drive device 1) by reducing the connector arrangement space, that is, the overall space between the connectors.

The arrangement direction A of the plurality of the power supply terminals 131 in the mouth of the power supply connector 355, the arrangement direction B of the plurality of the power supply terminals 132 in the mouth of the power supply connector 356, the arrangement direction C of the plurality of the vehicle communication terminals 311 and 312 in the mouth of the vehicle communication connector 357, and the arrangement direction D of the plurality of the torque signal terminals 331 and 332 in the mouth of the torque signal connector 358 are respectively different from each other. Consequently, it is possible to arrange the connectors 355, 356, 357, and 358 such that angles and orientations of the arrangement directions A, B, C, and D are different relative to one another so as to arrange the connectors 355, 356, 357, 358 closer together and reduce the arrangement space between the connectors.

Each terminal (e.g., 131, 132, 311, 312, 331, and 332) is configured such that the external connection end portion 121 of the terminal in the connector mouth is disposed radially inward from the substrate connection end portion 122 that connects the terminal to the substrate 230 of the controller 20. In other words, the external connection end portion 121 of the terminal is disposed closer to the axis Ax than the substrate connection end portion 122 of the terminal. The greater radial distance of the substrate connection end portion 122 from the axis Ax relative to the external connection end portion 121 is due to the bends 123 in the terminals. Each of the terminals has two bends 123 at positions between the external connection end portion 121 and the substrate connection end portion 122. Consequently, the bends 123 limit the effects of thermal distortion and warping when the substrate connection end portion 122 is soldered to the substrate 230, and the bends 123 can limits the stress from the external connection end portion 121 on the soldered joint at the substrate 230 when the external connectors are connected to the connectors.

The vehicle communication terminals 311 and 312 and the torque signal terminals 331 and 332 have the same shape. Consequently, further cost reductions may be realized by using common parts.

Connecting an external connector 168 to the torque signal connector 358 may be especially difficult for drive devices of the related technology due to the arrangement and orientation of the torque signal connector 358 and spacing between the torque signal connector 358 relative to the other connectors. When the drive device 1 of the present embodiment is installed in the vehicle (e.g., vehicle-installed state), the torque signal connector 358 is disposed above the power supply connectors 355 and 356 and the vehicle communication connector 357 in the vertical direction. Consequently, when the external connector 168 is already connected to the torque signal connector 358 before the subsequent connection of the other external connectors 165, 166, and 167, the connection of the external connector 168 prior to the connection of the other external connectors 165, 166, and 167 does not hinder the subsequent connections of the other external connectors 165, 166, and 167. In other words, the arrangement of the connectors in the drive device 1 of the present embodiment allows the external connector 168 to be connected first to the torque signal connector 358 while allowing the other external connectors to be easily connected to their corresponding connectors. As such, the drive device 1 of the present embodiment improves the ease of connecting the external connectors 165, 166, and 167, and can thus ease the installation and connection of the drive device 1 in the vehicle.

The connectors are arranged around the axis Ax of the motor 80. The connectors 355, 356, 357, and 358 respectively have the protrusion 395, 396, 397 or 398 for locking/engaging the respective external connector 165, 166, 167, and 168. The protrusions 395, 396, 397, and 398 are formed to protrude outward from the respective connectors in a direction away from adjacent connectors and toward a periphery of the drive device 1. Arranging the protrusions 395, 396, 397, and 398 in such a manner provides a greater work space around the protrusions/bosses 395, 396, 397, and 398 to operate an engaging lever on the external connector for engaging the external connector to the connector via the protrusions 395, 396, 397 and 398. Consequently, the ease of assembly is improved by arranging the protrusions 395, 396, 397, and 398 in such manner.

The lead wires 851 to 856 are connected to the substrate 230 of the controller 20 at a position outside the housing 830. The substrate 230 of the controller 20 is fixed to the base portion 350 of the connector part 35. The connector part 35 is axially arranged relative to the substrate 230 so as to not overlap the connection positions of the lead wires 851 to 856 to the substrate 230. As a result, at the time when the lead wires 851 to 856 are soldered to the substrate 230, the portion to be soldered is not hidden, impeded, or obscured by the connector part 35 to improve the ease of assembly and ease in soldering the lead wires 851, 852, 853, 854, 855, and 856 to the substrate 230.

Second Embodiment

Figure 9:
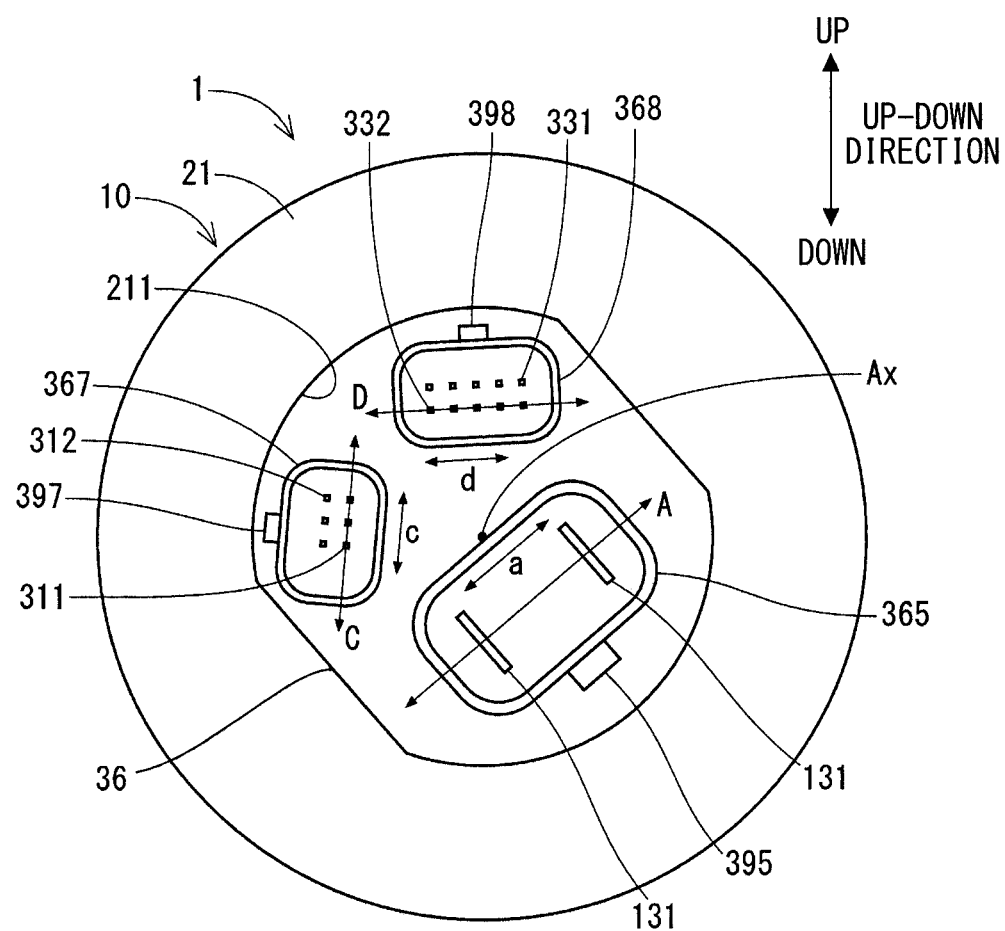
FIG. 9 illustrates a top view of an upper surface of a drive device in a second embodiment.
Figure 10:
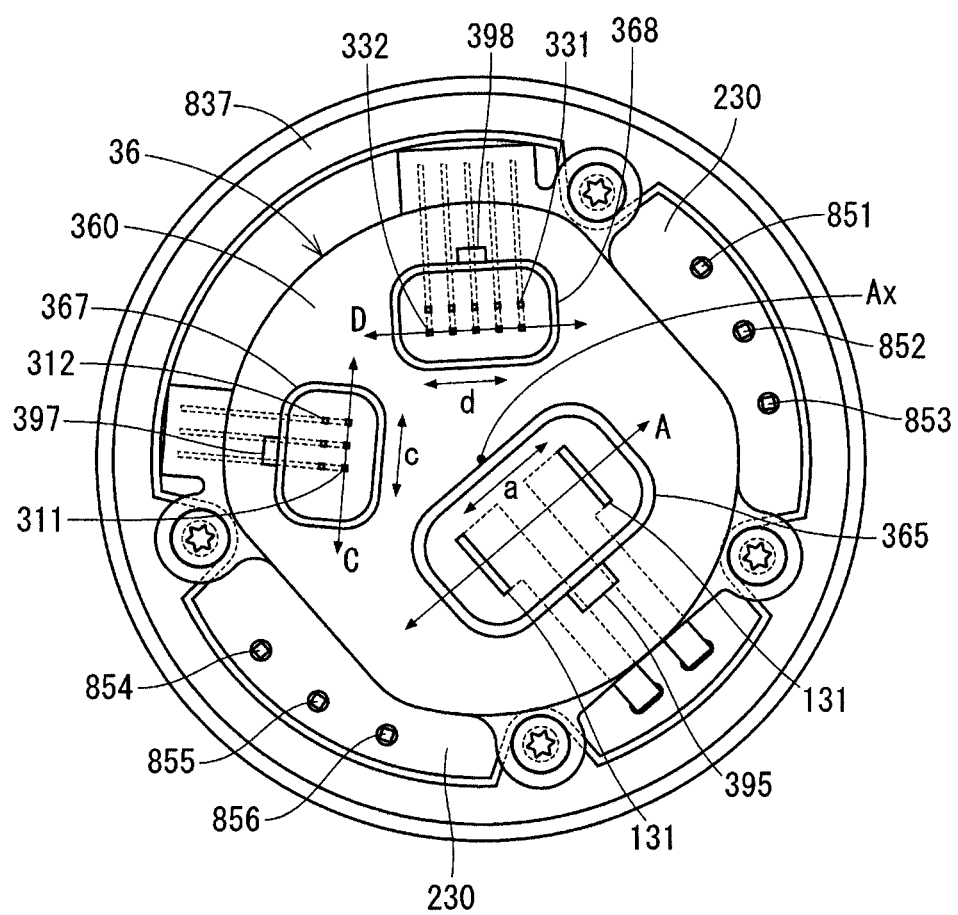
FIG. 10 illustrates a top view of the upper part of the drive device in the second embodiment.

The second embodiment is described with reference to FIGS. 9 and 10. In the second embodiment the controller of the control unit is one system, in contrast to the duplexed, redundant system described in the first embodiment. A connector part 36 has a base portion 360 with three connectors 365, 367, and 368. The power supply connector 365 houses (i.e., holds) the power supply terminals 131, the vehicle communication connector 367 houses the vehicle communication terminals 311, and the torque signal connector 368 houses torque signal terminals 331. When the drive device 1 is in the vehicle-installed state, the torque signal connector 368 is positioned so that the torque signal connector 368 is disposed above the power supply connector 365 and the vehicle communication connector 367 in the vertical direction. With the exception of the one system arrangement described above, the second embodiment is configured similarly to the configuration of the first embodiment and can achieve the same advantageous effects as those realized by the first embodiment.

Other Embodiments

In other embodiments having the duplexed, redundant system of the first embodiment, electric power may be supplied to each of the respective systems from a common, single power source.

In other embodiments, the controller may be fixed to the housing of the motor together with the connector part.

In other embodiments, the connector part may have five or more connectors. The five or more connectors may include a plurality of power supply connectors, vehicle communication connectors, depending on the number of systems. For example, the connector part may include (i) a first power supply connector holding the first power supply terminals, (ii) a first vehicle communication connector holding the first vehicle communication terminals, (iii) a first torque signal connector holding the first torque signal terminals, (iv) a second power supply connector holding the second power terminals, (v) a second vehicle communication connector holding the second vehicle communication terminals, and (vi) a second torque signal connector holding the second torque signal terminals.

In other embodiments, the motor may have two sets of winding wires arranged in-phase (i.e., in the same phase). The number of phases of the motor is not limited to three, but may be four or more. The motor to be driven by the drive device is not limited to an alternating current (AC) brushless motor, but may be a brushed direct current (DC) motor. In such cases, an H bridge circuit may be used as a "power converter."

In other embodiments, the drive device is not only applicable to an electric power steering apparatus, but may be applied to other electric motors.

Although the present disclosure is described by the above embodiments with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A drive device comprising:
a motor;
a controller coaxially disposed with the motor and configured to control the motor;
a connector part configured to connect to an external connector on an external cable; and
a cover configured to cover the controller, the cover having an opening and the cover is separate from the connector part, wherein
the connector part includes at least three connectors that extend and protrude axially through the opening of the cover in a direction of an axis of the motor, and wherein
a longitudinal axis of a mouth of each of the at least three connectors is angled and oriented differently than a longitudinal axis of a mouth of an adjacent connector, wherein the at least three connectors are positioned within an axial silhouette of the motor,
the connector part includes:
a power connector configured to hold a power terminal;
a vehicle communication connector configured to hold a vehicle communication terminal; and
a torque signal connector configured to hold a torque signal terminal,
the power terminal has an external connection end within the power connector and a substrate connection end configured to connect to a substrate of the controller, the power terminal having at least one bend between the external connection end and the substrate connection end, and wherein the substrate connection end of the power terminal is positioned at a greater radial distance from the axis of the motor than the external connection end of the power terminal,
the vehicle communication terminal has an external connection end within the vehicle communication connector and a substrate connection end configured to connect to the substrate of the controller, the vehicle communication terminal having at least one bend between the external connection end and the substrate connection end, and wherein the substrate connection end of the vehicle communication terminal is positioned at a greater radial distance from the axis of the motor than the external connection end of the vehicle communication terminal, and the torque signal terminal has an external connection end within the torque signal connector and a substrate connection end configured to connect to the substrate of the controller, the torque signal terminal having at least one bend between the external connection end and the substrate connection end, and wherein the substrate connection end of the torque signal terminal is positioned at a greater radial distance from the axis of the motor than the external connection end of the torque signal terminal.

2. The drive device of claim 1 further comprising:
a fastening member configured to fasten the connector part to the motor at a radial periphery of the connector part, wherein
the connector part and the fastening member are both positioned within the axial silhouette of the motor.

3. The drive device of claim 1, wherein
a plurality of power terminals are arranged along a first straight line having a first orientation that bisects the mouth of the power connector, and wherein
a plurality of vehicle communication terminals are arranged along a second straight line having a second orientation that bisects the mouth of the vehicle communication connector, and wherein
a plurality of torque signal terminals are arranged along a third straight line having a third orientation that bisects the mouth of the torque signal connector, and wherein
the first orientation of the first straight line is different than the second orientation of the second straight line and the third orientation of the third straight line, and wherein
the second orientation of the second straight line is different than the third orientation of the third straight line.

4. The drive device of claim 1, wherein
the vehicle communication terminal and the torque signal terminal have a same shape.

5. The drive device of claim 1, wherein
the torque signal connector is positioned above a position of the power connector and a position of the vehicle communication connector when the drive device is installed in a vehicle.

6. The drive device of claim 1, wherein
the at least three connectors are arranged on a circle that surrounds the axis of the motor, and wherein
the at least three connectors have a boss for engaging the external connector, wherein the boss protrudes outward from a long side of the mouth of the connector part toward a periphery of the drive device.

7. The drive device of claim 1, wherein
a lead wire is configured to extend from a set of winding wires of the motor to the controller and to connect to the controller at a position outside a housing of the motor, and wherein
the controller is disposed coaxially to, and fixed to, the connector part, wherein when the controller is fixed to the connector part, the connector part is positioned so to not overlap a connection position of the lead wire to the controller.

8. A drive device comprising:
a motor having a first set of winding wires and a second set of winding wires;

a controller coaxially disposed with the motor and configured to control the motor, the controller having a first system control unit configured to control power supplied to the first set of winding wires and a second system control unit configured to control power supplied to the second set of winding wires;

a connector part configured to connect to an external connector on an external cable; and a cover configured to cover the controller, the cover having an opening and separate from the connector part, wherein the connector part includes at least four connectors that extend and protrude axially through the opening of the cover in a direction of an axis of the motor, and wherein a longitudinal axis of a mouth of each of the at least four connectors is angled and oriented differently than a longitudinal axis of a mouth of an adjacent connector, wherein the at least four connectors are positioned within an axial silhouette of the motor.

9. The drive device of claim 8 further comprising:
a fastening member configured to engage the connector part near a periphery of the connector part and to fasten the connector part to the motor, the fastening member disposed at a greater radial distance from the axis of the motor than the at least four connectors, wherein
the at least four connectors and the fastening member are both positioned within the axial silhouette of the motor.

10. The drive device of claim 8, wherein
the at least four connectors includes:
a plurality of power connectors configured to hold a power terminal;
one or more vehicle communication connectors configured to hold a vehicle communication terminal; and
one or more torque signal connectors configured to hold a torque signal terminal.

11. The drive device of claim 10, wherein
a plurality of power terminals are arranged along a first straight line having a first orientation that bisects the mouth of at least one of the plurality of power connectors, and wherein
a plurality of vehicle communication terminals are arranged along a second straight line having a second orientation that bisects the mouth a vehicle connector, and wherein
a plurality of torque signal terminals are arranged along a third straight line having a third orientation that bisects the mouth of the one or more torque signal connectors.

12. The drive device of claim 10, wherein
the power terminal has an external connection end within at least one of the plurality of power connectors and a substrate connection end configured to connect to a substrate of the controller, the power terminal having at least one bend between the external connection end and the substrate connection end, and wherein the substrate connection end of the power terminal is positioned at a greater radial distance from the axis of the motor than the external connection end of the power terminal, and wherein the vehicle communication terminal has an external connection end within the one or more vehicle communication connectors and a substrate connection end configured to connect to the substrate of the controller, the vehicle communication terminal having at least one bend between the external connection end and the substrate connection end, and wherein the substrate connection end of the vehicle communication terminal is positioned at a greater radial distance from the axis of the motor than the external connection end of the vehicle communication terminal, and wherein the torque signal terminal has an external connection end within the one or more torque signal connectors and a substrate connection end configured to connect to the substrate of the controller, the torque signal terminal having at least one bend between the external connection end and the substrate connection end, and wherein the substrate connection end of the torque signal terminal is positioned at a greater radial distance from the axis of the motor than the external connection end of the torque signal terminal.

13. The drive device of claim 10, wherein the vehicle communication terminal and the torque signal terminal have a same shape.

14. The drive device of claim 10, wherein the one or more torque signal connectors is positioned above a position of at least one of the plurality of power connectors and a position of the one or more vehicle communication connectors when the drive device is installed in a vehicle.

15. The drive device of claim 8, wherein the at least four connectors are arranged on a circle that surrounds the axis of the motor, and wherein the at least four connectors have a boss for engaging the external connector, wherein the boss protrudes outward from the long side of the mouth of the connector part toward a periphery of the drive device.

16. The drive device of claim 8, wherein a lead wire configured to extend from a set of winding wires of the motor to the controller and to connect to the controller at a position outside a housing of the motor, and wherein the controller is disposed coaxially to and fixed to the connector part, wherein when the controller is fixed to the connector part, the connector part is positioned so to not overlap a connection position of the lead wire to the controller.

* * * * *